United States Patent [19]
Butterwick, Sr.

[11] Patent Number: 5,025,584
[45] Date of Patent: Jun. 25, 1991

[54] FISHING ROD HOLDER

[76] Inventor: Gerry A. Butterwick, Sr., 200 W. Northrup, Lansing, Mich. 48911

[21] Appl. No.: 536,325

[22] Filed: Jun. 11, 1990

[51] Int. Cl.$^5$ .......................................... A01K 97/10
[52] U.S. Cl. .................................... 43/21.2; 248/528
[58] Field of Search ................ 43/21.2; 248/519, 529, 248/528

[56] References Cited

U.S. PATENT DOCUMENTS

| | | |
|---|---|---|
| 2,606,731 | 8/1952 | Harris . |
| 2,645,050 | 7/1953 | Golias ................... 43/21.2 |
| 2,774,563 | 11/1956 | Pribis . |
| 3,159,366 | 12/1964 | Knight ................... 43/21.2 |
| 3,724,115 | 4/1973 | Derie ................... 43/21.2 |
| 4,245,419 | 1/1981 | McManus . |
| 4,479,322 | 9/1984 | Koppel . |
| 4,594,805 | 6/1986 | McClelland . |
| 4,848,021 | 7/1989 | Simko ................... 43/21.2 |

Primary Examiner—Kurt Rowan
Attorney, Agent, or Firm—Ian C. McLeod

[57] ABSTRACT

An improved fishing rod and reel holding device (10) is described. The holder consists of an elongated rectangular cross-sectioned base (11) with opposed supports (12) and (13) hinged to the base that automatically unfold to the use position when slide (20) of retainer (18) is manipulated to release pressure from the supports. At one end, the supports provide for legs that keep the base off the ground and which are wider than the base thereby helping to stabilze the holder. At the opposite end, the supports provide for grooves which cradle the fishing rod and reel so that a fisherman can easily grab the fishing rod when a fish strikes the line. For ease of storage and for carrying, the supports fold toward each other so that they lie adjacent to the top side of the base where they can be secured by the retainer.

15 Claims, 2 Drawing Sheets

FISHING ROD HOLDER

BACKGROUND OF THE INVENTION

(1) Field of the Invention

The present invention relates to a fishing rod and reel holding device In particular, the present invention relates to an apparatus which has an elongated rectangular cross-sectioned base with support members hinged to each of the short ends of the base. The hinges, which are spring loaded, allow for arcuate movement of the supports between an unfolded or use position and a folded or collapsed position In the folded position, the supports are secured adjacent to the top side of the base by manipulation of a retainer mounted between the opposed ends of the base. Releasing the retainer allows the hinges to bias the supports into the use position so that a fishing rod and reel can be rested in the holder, the rod handle resting on one of the supports and the pole resting on the other support.

(2) Prior Art

The prior art has described various types of fishing rod holding devices These devices are designed to free up a fisherman's hands for other activities between fish strikes. They also serve to cradle the fishing rod so that a fish will not be able to pull the fishing rod and reel overboard or offshore and to keep the fishing rod and reel up off the ground Illustrative of the prior art holder devices are U.S Pat. Nos. 2,606,731 to Harris; 4,156,982 to Phillips; 4,245,419 to McManus; 4,479,322 to Koppel; and 4,594,805 to McClelland.

Harris designed a holder that mounts on a boat for keeping a fishing rod and reel from going overboard when a fish is caught. The holder includes a U-shaped portion that is mounted on one end of a bar for receiving the reel. The front end of the bar is bent upwardly and is provided with a V-shaped notch for supporting the pole. Included at an intermediate position between the reel holder and the bent front end portion is an adjustable mechanism for locking the pole in the device and a C-clamp for connecting the holder to a boat. By mounting the reel in its holder and the rod in the V-notch, the rod can be locked in place which prevents the rod from being pulled overboard.

McClelland is illustrative of a collapsible fishing pole holder device. The McClelland device comprises a short wall member fixed to one end of an elongated rectangular base and two pivotable supports. One relatively long support is hinged at the opposite end of the base while the second, intermediate height support is hinged to the base between the fixed end and the first support. The supports are pivoted toward the base wall so that when they are folded down they lie adjacent to the base and form a relatively flat object that is easily carried and stored. When the holder device is unfolded for fishing, the reel sits between the fixed wall and the intermediate support while the pole rests in grooves provided at the two support ends opposite the hinges. In this manner, a fisherman can easily observe when a fish strikes the line and since the majority of the weight of the fishing rod and reel is distributed toward the fixed back wall, it is difficult for the fishing rod to be yanked out of the holder device. Koppel also describes a collapsible holder.

U.S. Pat. No. 2,774,563 to Pribis teaches a collapsible gun rest which is comprised of a box structure that can be opened to define two upwardly open box halves, each of which is provided with a movable support member having a V-shaped notch at an outer end. Each support member is pivotally mounted in its own box half, with the pivot connection being provided by a pin that extends through the box side walls and through an elongated slot within the support member. Accordingly, each notch member normally lies flat within its box portion but can be raised vertically with respect to the pivot pin. When pivoted into its use position, each member will be raised within the limits of the elongated slot during pivoting and then lowered into a receiving notch formed in the interior of the box. The box halves are connected together by means of a piano hinge and the two notched support members can be of different lengths.

OBJECTS

It is therefore an object of the present invention to provide an improved holding device for supporting a fishing rod and reel off the ice or ground which device has pivoting supports biased into the use position by spring loaded hinges that automatically unfold the supports when a retainer slide is released. Further, it is an object of the present invention to provide a fishing pole holding device that collapses into a thin, relatively flat object which is easy to carry and store away. Still further, it is an object of the present invention to provide a holder device for a fishing rod and reel that is simple and inexpensive to build and of a durable construction suitable for fishing in the outdoors. These and other objects will become increasingly apparent by reference to the following descriptions and to the drawings.

IN THE DRAWINGS

FIG. 1 is a left side perspective view of the holding device 10 particularly showing supports 12 and 13 pivotably mounted to base 11 and retainer 18 and accompanying fishing rod R.

Figure 1:
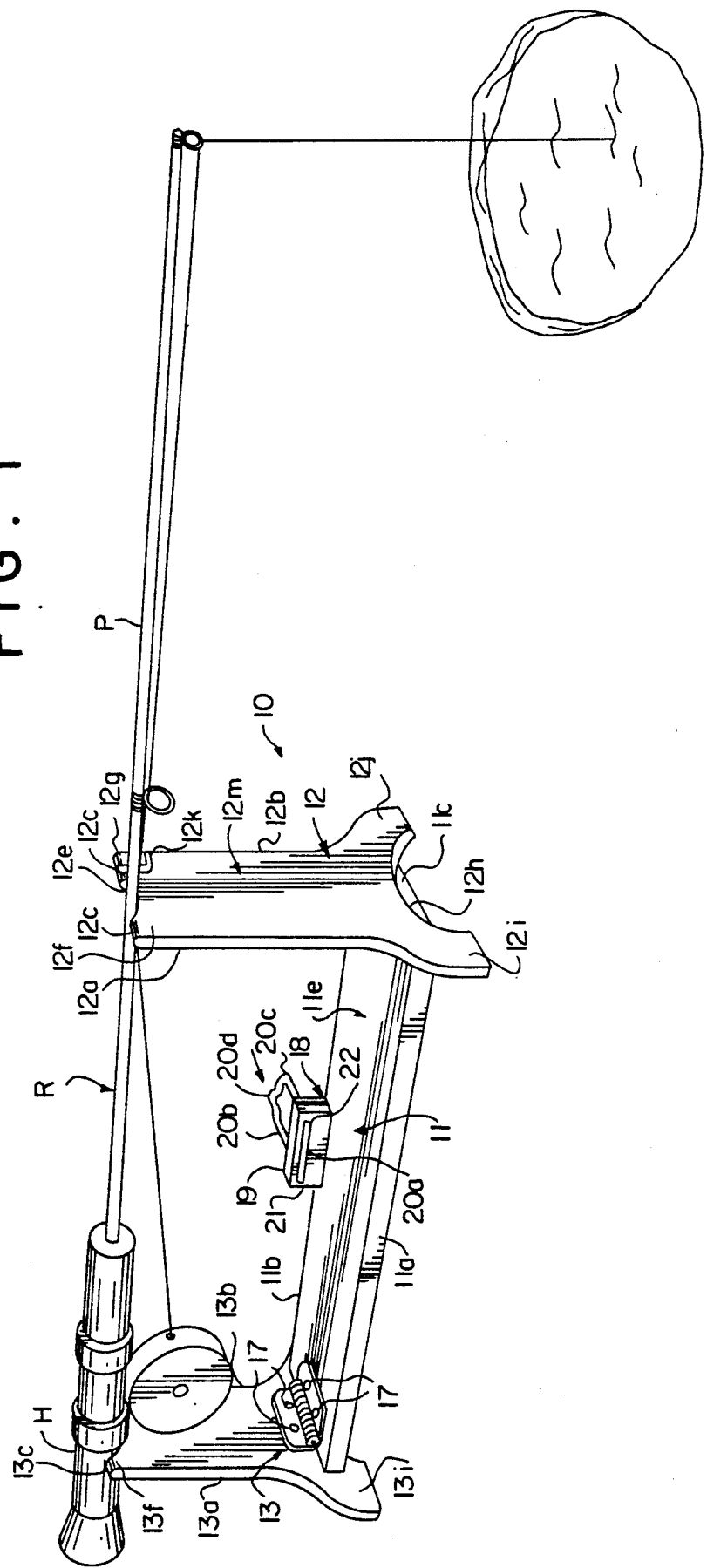
Figure 5:
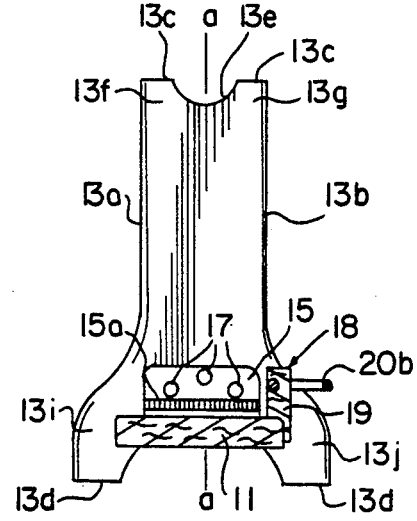

FIG. 5 i a cross-sectional view along line 5—5 of FIG. 1 showing support 13, spring loaded hinge 17 and retainer 18 attached to base 11.

GENERAL DESCRIPTION

The present invention relates to a holder device adapted for use with a rod for ice fishing which comprises:

(a) a base means having opposed ends adapted to be positioned along and in spaced relationship to a surface for supporting the holder device;

(b) support means having opposed ends pivotably mounted on each of the ends of the base means and intermediate to the opposed ends of the support means, for arcuate movement between an upright position and a folded position adjacent to the base means and wherein the support means are provided with legs at one of the ends of each of the support means for supporting the holder device on the surface and wherein each of the support means are provided with holder means for holding the ice fishing rod in position on the support means at opposite the ends of the support means from the legs;

(c) spring loaded hinge means mounted on each of the ends of the base means and on each of the support means so as to pivot and bias the support means to the upright position; and (d) retaining means provided between the base means and each of the support means which holds each of the support means in the folded position against the bias of the hinge means.

The holder device can be constructed of wood, plastic or metal for the base and the support members. Spring loaded hinges are commonly available.

SPECIFIC DESCRIPTION

Figure 2:
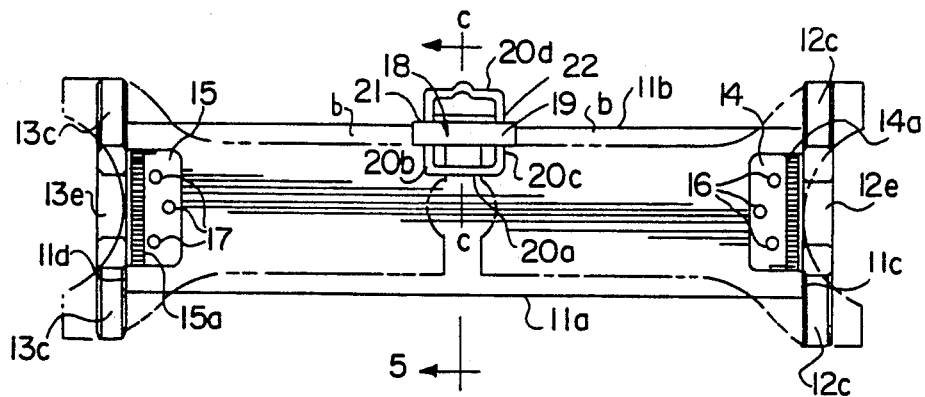
FIG. 2 is a top side plan perspective view of the holder of FIG. 1.
Figure 3:
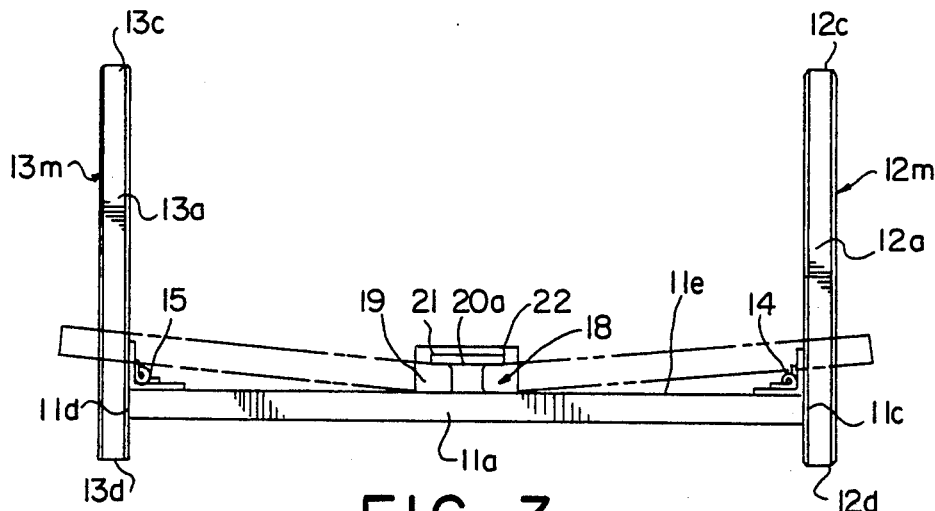
FIG. 3 is a left side front perspective view of the holder of FIG. 1.
Figure 4:
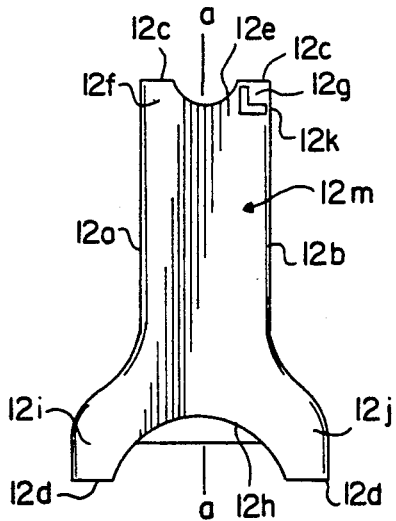
FIG. 4 is a right end view of support 12 shown in FIG. 1.

FIGS. 1 to 3 show the holder device 10 of the present invention that is adapted for use in holding a fishing rod R which comprises a base plate 11 and two accompanying support members 12 and 13. The base plate 11 has a substantially rectangular cross-section with spaced apart sides 11a and 11b and opposed ends 11c and 11d which extend to and meet the sides. Support 12 has a substantially rectangular cross-section perpendicular to the axis a-a above the base plate 11 as shown in FIG. 4. The support 12 is provided with spaced apart sides 12a and 12b which lower halves have a bell shaped taper downwardly and outwardly along the axis a-a and opposed ends 12c and 12d which extend to and meet the sides. The holder end 12c of support 12 is provided with a U-shaped indentation 12e that forms spaced apart arms 12f and 12g. The bottom end 12d of support 12 is provided with an inverted U-shaped indentation 12h that form spaced apart legs 12i and 12j which are wider than the width between sides 11a and 11b of base 11. Support 13 is a mirror image of support 12 (FIGS. 4 and 5) and includes sides 13a and 15b, ends 13c and 13d, indentation 13e between arms 13f and 13g and indentation 13h between legs 13i and 13j.

The supports 12 and 13 are secured to opposed ends 11c and 11d of base 11 respectively, by spring loaded hinges 14 and 15, respectively. Coil springs 14a and 15a bias the hinges 14 and 15 apex. Hinge 14, which is secured to support 12 adjacent to the apex of indentation 12f and which is secured to the top side 11e of base plate 11 adjacent to end 11c by screws 16, acts to bias support 12 in an upright or use position. Similarly, hinge 15 which is secured to support 13 adjacent to the apex of indentation 13f and which is secured to the top side 11e of plate 11 adjacent to end 11d by screws 17, acts to bias support 13 in an upright position. Hinges 14 and 15 allow for arcuate movement of supports 12 and 13 respectively between an upright position and a folded position adjacent to the top side 11e of base plate 11 (FIGS. 2 and 3).

In the folded position, the width of the supports 12 and 13 above the legs 12i and 12j and 13i and 13j and the width of the base 11 is such that a retainer 18 can engage the supports 12 and 13 in contact with the top sides 12m and 13m of supports 12 and 13 for carrying and storing the holder device. As shown in FIG. 2, the retainer is mounted on the top side 11e of base 11 adjacent to side 11b at a mid point between ends 11c and 11d. Retainer 18 comprises a pedestal 19 which has a rectangular cross-section along the axis b-b and a slide 20 has pedestal 19 (FIG. 2). Slide 20 comprises of bottom section 20a and opposed side sections 20b and 20c connected to opposite ends of the bottom section 20a forming a U-shape which is closed by loop section 20d opposite and parallel to bottom section 20a. Spaced apart openings 21 and 22, provided in pedestal 19 on opposite sides of the axis c-c which is perpendicular to the axis b-b, provide for side wire sections 20b and 20c, respectively.

When the support 12 is folded down adjacent to the top side 11e of base plate 11, the slide 20 is moved forward to engage the support 12 by pushing forward on section 20d so that the right part of the bottom section 20a and the bottom part of side section 20b fit into L-shaped channel 12k provided on the outside surface 12m of arm 12g (FIG. 1 and 4). In a similar manner, support 13 is secured in the folded position by the left part of bottom section 20a and the bottom part of side section 20c which fit into a L-shaped channel (not shown) on the outside surface 13m of support 13.

To set up the holder device 10, slide 20 is moved backward by pulling back on section 20d so that side sections 20b and 20c slide backwards in openings 21 and 22. This allows slide 20 to disengage from channel 12k of support 12 and from the corresponding channel (not shown) on the outside surface 13m of support 13 so that spring loaded hinges 14 and 15 can simultaneously bias supports 12 and 13, respectively, into the upright or use position. A fishing rod and reel R can then be positioned in the holder device 10 with the handle H resting in indentation 13e of support 13 and the pole P resting in indentation 12e of support 12.

It will be appended that strips or the like (not shown) could be between spaced apart arms 12f and 12g and arms 13f and 13g. Generally for ice fishing they are not necessary. Also it will be appended that the springs on the hinges 14 and 15 could be other than coil springs. Coil springs are preferred. Likewise the retainer 18 can be of any type which holds one or both of the supports 12 and 13 in position when the supports 12 and 13 are folded. All of these variations will be obvious to those skilled in the art.

It is intended that the foregoing description be only illustrative of the present invention and that the present invention be limited only by the hereinafter appended claims.

I claim:

1. A holder device adapted for use with a rod for ice fishing which comprises:

(a) a base means having opposed ends adapted to be positioned along and in spaced relationship to a surface for supporting the holder device;

(b) support means having opposed ends pivotably mounted on each of the ends of the base means and intermediate to the opposed ends of the support means, for arcuate movement between an upright position and a folded position adjacent to the base means and wherein the support means are provided with legs at one of the ends of each of the support means for supporting the holder device on the surface and wherein each of the support means are provided with holder means for holding the ice fishing rod in position on the support means at opposite the ends of the support means from the legs;

(c) spring loaded hinge means mounted on each of the ends of the base means and on each of the support means so as to pivot and bias the support means to the upright position; and (d) retaining means provided between the base means and each of the support means which holds each of the support means in the folded position against the bias of the hinge means.

2. The device of claim 1 wherein the base means is elongate and has a substantially rectangular cross-section between the ends and between sides between the ends.

3. The device of claim 2 wherein each of the support means of the opposed ends has indentations providing the legs and opposed indentations providing the holder means for the rod.

4. The device of claim 3 wherein each of the support means has opposed sides between the end supporting the rod and the legs there are two spaced apart legs on each of the support means and wherein the legs are further apart than the sides of the support means.

5. The device of claim 4 wherein a width of the support means between the sides above the legs and a width of the base means between the sides are such that the support means can be folded for sliding engagement by the retaining means.

6. The device of claim 1 wherein the base means has opposed sides between the ends the retaining means includes a slide means mounted in a pedestal means on one of the sides of the base means and wherein the retaining means is linearly moveable into and out of engagement with an upper surface of each of the folded support means.

7. The device of claim 6 wherein the slide means is a heavy gauge U-shaped wire with a bottom wire and two side wires connecting the bottom wire and which is pushed by hand in the pedestal with the bottom wire and side wires in engagement with the upper surface of the support means in the folded position.

8. The device of claim 7 wherein the wire has a loop which closes the side wires of the U-shaped wire opposite the bottom wire and wherein the loop provides a means for movement of the slide means in the pedestal by hand.

9. The device of claim 1 wherein the hinges include coil springs along an axis of the hinge means which provides the bias pivoting of the support means.

10. The device of claim 1 wherein the base means has sides between the ends and has a substantially rectangular cross-section between the ends and between the sides between the ends, wherein each of the support means has opposed ends which indentations providing the legs and opposed indentations providing holder means for the rod, wherein there are two spaced apart legs on the support means, wherein the legs are further apart than the opposed sides of the support means above the legs, wherein a width of the support means between the sides above the legs and a width of the base means are such that the support means can be folded for sliding engagement by the retaining means.

11. The device of claim 10 wherein the slide means is a heavy gauge U-shaped wire with a bottom wire and two side wires connecting the bottom wire and which is pushed by hand in the pedestal with the bottom wire and side wires in engagement with the upper surface of the support means in the folded position.

12. The device of claim 11 wherein the wire has a loop which closes the side wires of the U-shaped wire opposite the bottom wire and wherein the loop provides a means for movement of the slide means in the pedestal by hand.

13. The device of claim 11 wherein the hinges include coil springs along an axis of the hinge means which provided the pivoting of the support means.

14. The device of claim 10 wherein the retaining means engages each of the support means in the folded position adjacent to the indentations for holding the rod.

15. The device of claim 1 wherein the support means and base means are substantially perpendicular in the upright position.

* * * * *